United States Patent

Saltzberg

[15] 3,671,670

[45] June 20, 1972

[54] DIGITAL FILTER FREQUENCY-SHIFT MODULATOR

[72] Inventor: Burton R. Saltzberg, Middletown, N.J.

[73] Assignee: Bell Telephone Laboratories, Incorporated, Murray Hill, Berkeley Heights, N.J.

[22] Filed: April 15, 1970

[21] Appl. No.: 28,872

[52] U.S. Cl. ..............................178/67, 325/38 R, 325/159, 325/163, 332/9

[51] Int. Cl. ......................................H04l 27/12, H04b 1/04

[58] Field of Search ..........................325/30, 38 R, 163, 159; 178/67; 331/178; 332/9

[56] References Cited

UNITED STATES PATENTS 3,551,849 12/1970 Choquet ..................................332/9

*Primary Examiner*—Robert L. Griffin
*Assistant Examiner*—Albert J. Mayer
*Attorney*—R. J. Guenther and Kenneth B. Hamlin

[57] ABSTRACT

Unity gain feedback places a second-order digital filter on the borderline of stability. The filter therefore oscillates in a numerical sense. Two feedback multipliers, each capable of determining a different central coefficient (and thus different oscillation frequencies) are alternatively inserted into an independent feedback path under control of an input baseband data signal whereby the output frequency is shifted in accordance with the input data. Phase discontinuities and amplitude variations due to the frequency shift are eliminated by extracting the numbers stored in the filter when a data transition occurs and reinserting new numbers representing samples of the new frequency wave, the new numbers further defining points on the new wave having the same instantaneous amplitude and phase as the wave samples defined by the extracted numbers.

11 Claims, 3 Drawing Figures

INVENTOR
B.R. SALTZBERG
BY R C Lipton
ATTORNEY

DIGITAL FILTER FREQUENCY-SHIFT MODULATOR

FIELD OF THE INVENTION

This invention relates to frequency-shift signal transmitters and, more particularly, to signal transmitters, such as frequency-shift signal modulators, which utilize digital filtering techniques and are therefore capable of being shared, on a time-division basis, by a plurality of signaling sources.

DESCRIPTION OF THE PRIOR ART

In the data processing and data switching arts the central processor or switcher terminates large numbers of outgoing data signaling channels. The data channel, in many instances, will comprise a telephone line which conventionally is suitable to convey voice frequency signals. Accordingly, voice frequency-shift signals representing the dc data baseband signals from the processor or switcher signaling source are generated and applied to the appropriate signaling channels. Switching the frequency of the voice frequency signal carrier under control of the dc data signals is provided by a data set transmitter modulator, which generally utilizes (inductive and/or capacitive) oscillatory circuits to produce the voice frequency signals.

Since a plurality of outgoing channels are terminated, the data set transmitters (together with receivers and control equipment) are sometimes grouped to form an arrangement called a multiple data set. To reduce the size, cost and complexity of the multiple data set, it is advantageous to employ equipment which can be used in common by the data set transmitters.

The most significant circuit in the transmitter is the oscillatory circuit. It is known that unstable filter circuits tend to oscillate and therefore comprise one form of oscillatory circuit. It is further known that, with respect to filtering signals, digital filtering can be employed, on a time-shared basis, to accommodate a plurality of signal sources.

Digital filtering is the computational process wherein sequential numbers which define samples of an analog signal are digitally processed to simulate continuous filter functions. The digital filter is, therefore, the digital circuitry which performs the computational process. The filtering process involves the weighting of previous and the present samples of the signal. One way this can be implemented is to feed back the filter output numbers through multipliers which determine the coefficients of the filter. The output of the digital filter then comprises numbers, in sequence, which define signal samples of an analog signal and the output thus corresponds to the output of an analog filter. It is obvious that a plurality of analog signals can be processed in this manner by multiplexing, on a time-division basis, the numbers representing the samples of the various signals. The digital filter is therefore capable of being shared on a time-shared basis by a plurality of channels.

In my copending application, Ser. No. 884,128, which was filed on Dec. 11, 1969, there is disclosed a data set transmitter which utilizes digital circuitry, including a digital filter, to generate frequency-shift signals (in a numerical sense) representing data signals. Since digital circuitry is employed, the transmitter is capable of being shared on a time-shared basis by a plurality of data sources.

In the application there is disclosed a second-order digital filter employing two delay unit memories for storing two numbers representing successive signal samples. Also disclosed is a unity gain feedback circuit to place the digital filter on the borderline of stability. The filter therefore "oscillates" (in a numerical sense). In addition, two feedback multipliers are provided, each capable of determining different central coefficients (and thus different oscillatory frequencies). Switch means operated by the data signals from the signal sources alternatively inserts one or the other multipliers in an independent feedback path of the filter whereby the output frequency of the filter is shifted in accordance with the input data signals.

In frequency-shift modulators, such as the above-described type, amplitude changes and phase discontinuities (sometimes called jitter) are produced when the frequency is shifted. These discontinuities are usually small enough to be acceptable for low-speed data when the frequency shift is small. If the frequency deviation is relatively large, however, the phase discontinuities and the amplitude variations may not be tolerable.

It is therefore an object of this invention to provide an improved frequency-shift digital filter modulator, the improvement involving the elimination of jitter due to frequency shift.

SUMMARY OF THE INVENTION

In accordance with this invention, the jitter is eliminated by changing the numbers stored by the digital filter delay unit memories at the instant of the frequency shift. More specifically, each time a data signal transition is detected, the stored numbers are extracted, new numbers are generated defining signal samples of a wave having the new (shifted) frequency and having the same amplitude and phase as the prior wave samples defined by the stored numbers and the new numbers are inserted into the digital filter.

It is a feature of this invention that the new numbers are calculated by obtaining the values of the extracted number and modifying that value by a predefined expression.

In accordance with a specific embodiment of the invention each new number calculation is provided by processing two numbers extracted from the two delay unit memories. In accordance therewith, the new number value is determined by a predefined expression which includes the sum or difference of the two extracted numbers.

The foregoing and other objects and features of this invention will be more fully understood from the following description of illustrative embodiments thereof taken in conjunction with the accompanying drawings.

DETAILED DESCRIPTION

Figure 3:
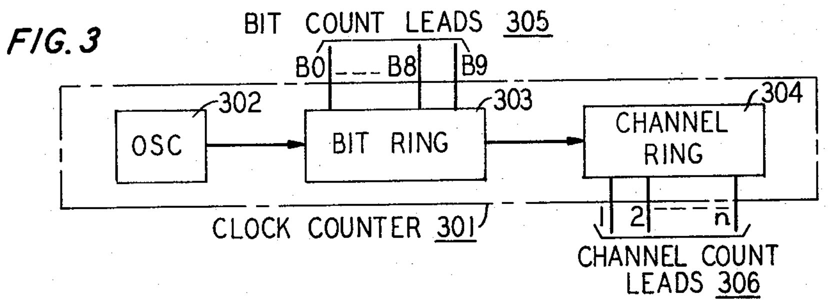
FIG. 3 shows, in schematic form, a suitable arrangement for a common clock circuit.

The frequency-shift digital modulator is advantageously embodied in a system which may be described as a multiple data set transmitter which interconnects a plurality of sources of baseband binary data signals and a corresponding plurality of outgoing telephone lines. Specifically, the dc baseband data signals from each of the data sources are frequency modulated on a voice frequency carrier and the frequency-shift signals provided therefrom are applied to the corresponding telephone line. In general, these functions are provided by a scanner, identified in FIG. 1 by block 102, digital FSK modulator 103', distributor 104 and clock counter 301, FIG. 3, which maintains the system synchronized. It is to be noted that scanner 102, distributor 104 and clock counter 301 are arranged and function in substantially the same manner as the correspondingly identified scanner, distributor and clock counter in my above-mentioned copending application.

Figure 1:
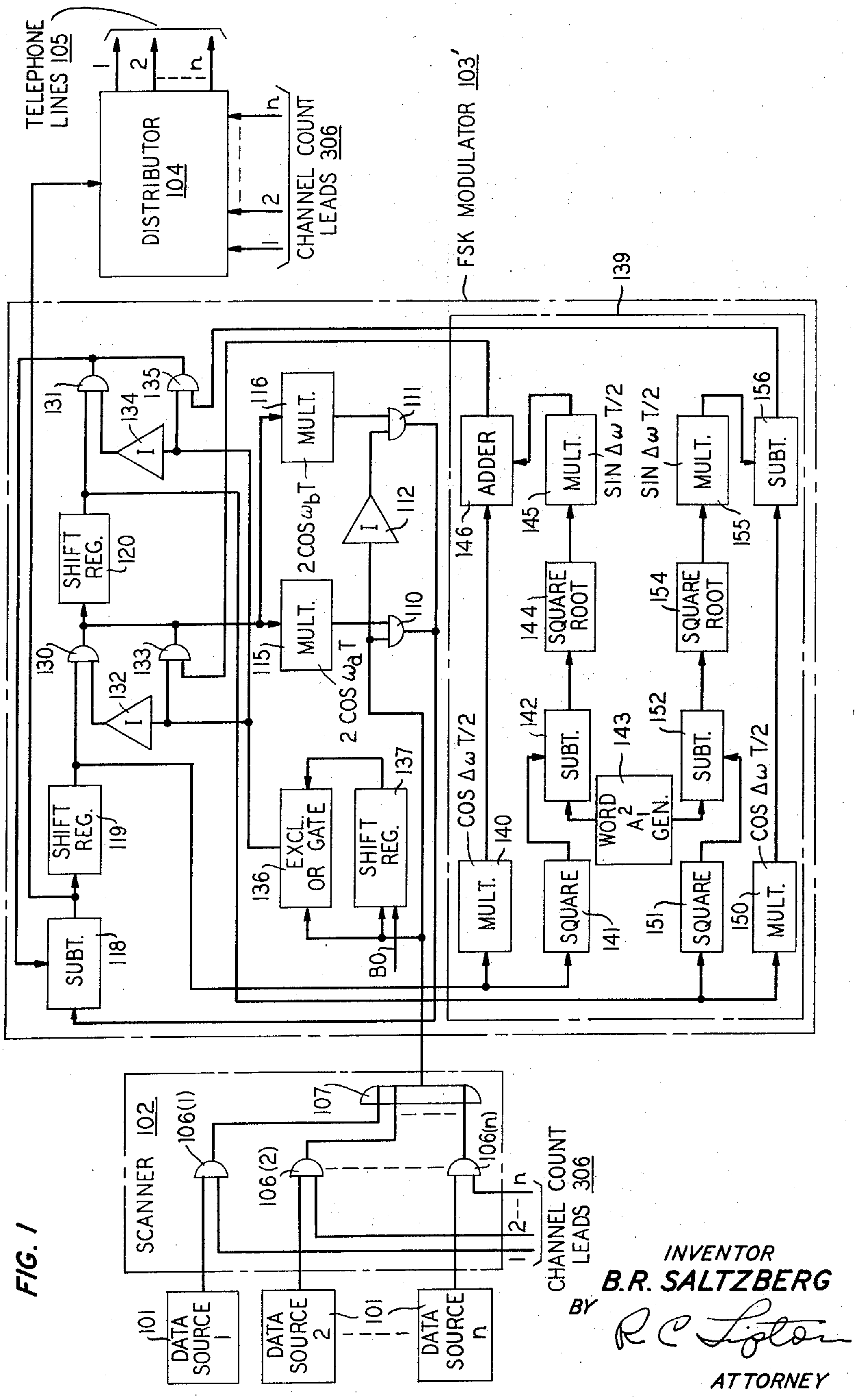
FIG. 1 discloses, in schematic form, the various equipment, including a digital filter frequency-shift modulator, and the manner in which they cooperate to form a multiple data set transmitter in accordance with this invention.

Scanner 102 is connected to a plurality of data sources identified as a group as data sources 101. In FIG. 1, there are shown *n* data sources represented by blocks and identified by numbers 1 to *n* and each block so identified represents a source of dc baseband binary signals. Scanner 102 generally provides the function of scanning the dc baseband signals provided by data sources 101 under the control of scanning or gating signals generated by clock counter 301; scanner 102 thereby produces at the output thereof successive trains of bits, each train comprising a sequence of bits corresponding to the sequential scanning of the data signals produced by sources 1 through *n* of data sources 101. The output of scanner 102 is then passed to FSK modulator 103'.

The function of FSK modulator 103' is to utilize each bit (which is derived from an individual data source) to process a number (dedicated to the data source) by use of digital filter techniques and thereby derive output numbers, each defining the instantaneous polarity and amplitude of a frequency-shift signal. Each incoming bit from scanner 102 functions to modify the processing of the number in FSK modulator 103' by shifting (in a numerical succession) the frequency of the output signal to above the carrier midband frequency when the incoming bit indicates a "mark" signal (for example) and to below the midband carrier frequency when the incoming bit indicates a "space" signal. To this extent, FSK modulator 103' functions and is arranged in substantially the same manner as FSK modulator 103, disclosed in my copending application. In addition, FSK modulator 103' is modified in accordance with this invention to eliminate the jitter of the frequency-shift signal which occurs when the incoming bit indicates a transition from a "mark" signal to a "space" signal, or vice versa, in a manner described hereinafter. The output of FSK modulator 103' then extends to distributor 104.

Distributor 104, which is shown in block form in FIG. 1, is arranged in substantially the same manner as the correspondingly identified distributor in my copending application. As disclosed therein, distributor 104 accepts the output numbers from the FSK modulator and, under control of channel count leads 206 from clock counter 301, provides three functions; namely:

1. Scans and distributes to individual channels therein the successive numbers developed by the FSK modulator;
2. Converts each digital number to a corresponding analog signal; and
3. Applies the analog signal to a corresponding one of telephone lines 105.

Clock counter 301, as previously noted, produces a channel count for the sequential sampling of the channels and the sequential distribution of the signals to telephone lines 105. In addition, clock counter 301 provides the bit count for the multibit counter (which is, in this case, a 10-bit number). Clock counter 301 generally includes a clock source such as oscillator 302, bit ring 303 and channel ring 304. The output of oscillator 302 is applied to and drives bit ring 303. Bit ring 303 advantageously comprises a 10-stage ring counter, each stage providing an output to one of 10 leads shown as bit count leads 305 and individually identified as leads B0 through B9. Accordingly, starting with lead B0 of bit count leads 305, the leads are sequentially pulsed or enabled to define the time slots dedicated to the serial bits in each multibit number. The output of bit ring 303 (i.e., the output derived when final lead B9 of bit count leads 305 is pulsed) is passed to channel ring 304. Channel ring 304 advantageously also comprises a multistage ring counter, the number of stages corresponding to the number of data sources. Each stage of channel ring 304 provides an output of one of *n* leads shown as channel count leads 306. Accordingly, the *n* leads of channel count leads 306 are sequentially pulsed or enabled, each sequential pulse occurring after the complete cycling of bit ring 303, that is, after all of the leads of bit count leads 305 are sequentially pulsed.

As previously discussed, the sequential pulses on channel count leads 306 are utilized for scanning baseband signals derived from data sources 101. The sequential pulses and therefore the rate at which channel ring 304 is driven define the scanning or sampling frequency. As described in detail hereinafter, the sampling frequency is related to the frequency of FSK signals which will be passed to the telephone lines. In the specific embodiments shown, the specific mark frequency of the FSK signal is 2225 Hz and the spacing frequency is 2,025 Hz. As a good practical choice a sampling frequency of approximately four times that of the higher transmitted frequency has been selected. In any event the frequency of oscillator 302 is arranged to drive bit ring 303 at a rate which drives, in turn, channel ring 304 at a rate which defines the predetermined sampling frequency.

Turning now to scanner 102, it is recalled that the scanner functions to sequentially sample the dc data baseband signals from data sources 101. As seen in FIG. 1, each data source is connected to an individual gate in scanner 102. Specifically, data source 1 is connected to one input of gate 106(1) and each of the other data sources extends to a corresponding one of gates 106(2) through **106(*n*). The other inputs to gates 106(1) through 106(*n*) are connected to individual ones of channel count leads 306 which leads, as previously described, are sequentially pulsed or enabled to provide the time slots dedicated to each data source. Thus, the dc baseband signals from data sources 101 are sequentially sampled and passed through gates 106(1) to 106(*n*) to OR gate 107. The output of OR gate 107 therefore comprises sequential bit trains, each bit train comprising a sequence of bits, each bit in the train aligned in a time slot dedicated to a data source and defining the dc baseband signal of that particular source. The signal bit trains are then passed to FSK modulator 103'**.

FSK modulator 103' may generally be defined as a second-order digital filter which serves as a switchable oscillator, the switching being provided by the bit train output of scanner 102. The signal processed by the filter is a *k* bit binary serial bit number which re-occurs every *T* seconds (in the present embodiment a 10-bit number in the two'S-complement form is utilized). In general, the digital filter which provides the number processing includes serial subtractor circuit 118, unit delay circuits 119 and 120 (which individually comprise shift register circuit memories) and feedback multiplier circuits 115 and 116. It is to be noted that unit delay circuits 119 and 120 are interconnected by way of normally enabled AND gate 130 and feedback multiplier circuits 115 and 116 are arranged in alternative feedback paths from the output of AND gate 130 to the input of subtractor circuit 118 by way of gates 110 and 111, respectively. As described in detail hereinafter, gates 110 and 111 operate under control of the signal bit train output of scanner 102 to alternatively insert one or the other of multiplier circuits 115 and 116 into the filter feedback path. It is to be further understood that unless indicated otherwise, the various circuits in the filter constitute digital circuits and the inputs thereof are clocked in by a clock source derived from bit-count leads 305. Specifically, the bit-count leads are advantageously ORed together to provide a clock pulse source having a rate determined by the pulses on all bit-count leads. The bit-count lead rate *R* is therefore determined by the equality $$R = kn/T \qquad 1.$$

where $1/T$ is the sampling frequency, *n* is the number of channels and *k* is the number of bits per serial number.

As previously indicated, FSK modulator 103' also includes, in accordance with this invention, an arrangement for overcoming jitter occurring as the signal frequency shifts due to the transition of the incoming dc baseband signal. This function is provided by a correction circuit. One such circuit is generally indicated by block 139 in FIG. 1.

The correction provided by circuit 139 is inserted in the output of delay circuit memories 119 and 120 each time an incoming data signal transition occurs. The occurrence of the transition is detected by exclusive OR gate 136 in cooperation with unit delay circuit 137 (which delay circuit is arranged in the form of a shift register). The functions of correction circuit 139, together with exclusive OR gate 136, are described in detail hereinafter.

Each of the delay circuits 119 and 120 is advantageously a multistage shift register shifted at clock rate R and having a sufficient number of stages to store the 10-bit words of all channels, i.e., **10*n* stages. The multiplier circuits 115 and 116** are advantageously arranged in the same manner as the correspondingly identified multiplier circuits described in my copending application and, as noted in the copending application, the multiplier circuits provide the two's-complement conversion.

The transfer function, $H(z)$, of the filter is determined by the equation $$H(z)=\frac{1}{1-2z\cos\omega_1 T+z^2} \quad (2)$$

where $\omega_1$ is the desired mark or space frequency of the outgoing frequency shift signal and $z$ is the delay operator and may be related to the Laplace and Fourier transforms by the equality $$z=e^{sT}=e^{j\omega T} \quad 3.$$

where $j\omega$ is the imaginary part of the complex frequency $s$ and $\omega$ is the radian frequency.

The transfer function, $H(z)$, has poles on the unit circle at $$z=e^{\pm j\omega_i T} \quad (4)$$

In the $S$-plane, the poles are on the imaginary axis at $$s=j(\pm\omega_i+k/T) \quad 5.$$

where $k=0, \pm1, \pm2,\ldots$ This is the borderline of stability, so that once started, the filter will continue to oscillate at a frequency of $\omega_i$ without growth or damping. This is implemented by feeding back the output of delay circuit 120 to an input of subtractor 118 by way of a direct path via normally enabled gate 131, as shown; the direct path providing unity gain.

The frequency of oscillation is determined by the central coefficient (or multiplier factor) which is expressed as $$2\cos\omega_i T \quad 6.$$

Each multiplier circuit 115 and 116 is assigned a multiplier factor or constant which is consistent with the desired mark and space frequency. Defining the desired mark frequency as $\omega_a$ and the desired space frequency as $\omega_b$, the central coefficient for the mark frequency is expressed as $$2\cos\omega_a T \quad 7.$$

and the central coefficient for the space frequency is expressed as $$2\cos\omega_b T \quad 8.$$

Frequency shift keying is accomplished by changing the central coefficient under control of the pulse train output of scanner 102. When a one bit (which we may consider as defining the scanned bit derived from a mark signal) is obtained from scanner 102, this bit enables gate 110 to insert multiplier 115 in the filter feedback path with multiplier 115 being assigned the multiplier factor defined in Equation 7. The filter therefore oscillates at the mark frequency. If, however, a scanned "0" bit, derived from a space signal, is provided by scanner 102, gate 111 is enabled because of the inversion of the bit by inverter 112. This inserts multiplier 116 in the filter feedback path and with multiplier 116 being assigned the multiplier factor defined in Equation (8, the filter oscillates at the spacing frequency. Accordingly, the switchable filter oscillator will provide at its output, that is, at the output of subtractor 118, samples of a frequency shift signal (in a numerical sequence). Thus, the frequency is determined upon which multiplier, 115 or 116, is inserted in the feedback path of the filter.

When a transition of the data signal occurs, phase discontinuities and/or amplitude variations may occur when the frequency deviation is relatively large. In accordance with this invention, the contents of the digital filter memory, that is, the contents of shift registers 119 and 120, are altered when the coefficient is changed to compensate for the phase discontinuities and amplitude variations.

As discussed in an article "An Analysis of Inherent Distortion in Asynchronous Frequency-Shift Modulators," by L. R. Bowyer and W. H. Highleyman, *Bell System Technical Journal*, Vol. XLI, Nov. 1962, pages 1,695–1,736, the wave shape before the transition is given by $$A_1\cos(\omega_1 T+\Phi_1) \quad 9.$$

where $A_1$ is the amplitude, $\omega_1$ is the angular frequency, and $\Phi_1$ is the phase of the wave prior to the transition. After the transition, the wave shape is defined as $$A_2\cos(\omega_2 T+\Phi_2) \quad 10.$$

where $A_2$ is the amplitude, $\omega_2$ is the angular frequency, and $\Phi_2$ is the phase of the wave after the transition. It is convenient to choose the time origin ($t$=0) at a point midway between the two previous samples in registers 119 and 120 rather than the time of the coefficient change. Therefore, the two previous samples occur at:

$$t=\pm T/2 \quad 11.$$

Accordingly, the contents of the digital filter memory (shift registers 119 and 120) consist of the two previous samples $X_1$ and $X_2$ where, $$X_1=A_1\cos\left[-\omega_1\frac{T}{2}+\Phi_1\right] \quad (12)$$

$$X_2=A_1\cos\left[\omega_1\frac{T}{2}+\Phi_1\right] \quad (13)$$

As previously discussed, to eliminate jitter after the frequency shift, the amplitude and the phase of the wave should be continuous. The two samples in the digital filter memory after the transition must therefore be satisfied by the expressions:

$$Y_1=A_1\cos\left[-\omega_1\frac{T}{2}+\Phi_1\right] \quad (14)$$

$$Y_2=A_1\cos\left[\omega_2\frac{T}{2}+\Phi_1\right] \quad (15)$$

If we introduce the term $\Delta\omega$ where $$\Delta\omega=\omega_2-\omega_1 \quad 16.$$

then $$\omega_2=\Delta\omega+\omega_1 \quad 17.$$

The memory contents $Y_1$ and $Y_2$ of shift registers 119 and 120 after the transition then become $$Y_1=A_1\cos\left(-\Delta\omega\frac{T}{2}-\omega_1\frac{T}{2}+\Phi_1\right) \quad (18)$$

$$Y_2=A_1\cos\left(\Delta\omega\frac{T}{2}+\omega_1\frac{T}{2}+\Phi_1\right) \quad (19)$$

With respect to the memory contents of shift register 119 as defined in Equation 18. this expression when expanded is expressed as follows $$Y_1=A_1\left[\cos\left(-\omega_1\frac{T}{2}+\Phi_1\right)\cos\Delta\omega\frac{T}{2}+\sin\left(-\omega_1\frac{T}{2}+\Phi_1\right)\sin\Delta\omega\frac{T}{2}\right] \quad (20)$$

Substituting therein the term $X_1$ as defined in Equation 12., there is obtained $$Y_1=X_1\cos\Delta\omega\,T/2+A_1\sin(-\omega_1\,T/2+\Phi_1)\sin\Delta\omega\,T/2 \quad 21$$

Similarly, the contents of shift register 120, as defined in Equation 19 defines the following expression when expanded $$Y_2=A_1\left[\cos\left(\omega_1\frac{T}{2}+\Phi_1\right)\cos\Delta\omega\frac{T}{2}-\sin\left(\omega_1\frac{T}{2}+\Phi\right)\sin\Delta\omega\frac{T}{2}\right] \quad (22)$$

Substituting therein the value of $X_2$ as defined in Equation 13, there is obtained $$Y_2 = X_2 \cos \Delta\omega T/2 - A_1 \sin(\omega_1 T/2 + \Phi) \sin \Delta\omega T \quad (23)$$

The term $\Phi_1$ in Equations 21 and 23 is unknown however. The following equalities are therefore noted:

$$A_1 \sin\left(-\omega_1\frac{T}{2}+\Phi_1\right)=\sqrt{A_1^2}\cdot\sqrt{1-\cos^2\left(-\omega_1\frac{T}{2}+\Phi_1\right)} \quad (24)$$

$$=\sqrt{A_1^2-A_1^2\cos^2\left(-\omega\frac{T}{2}+\Phi_1\right)} \quad (25)$$

$$=\sqrt{A_1^2-X_1^2} \quad (26)$$

and similarly, $$A_1 \sin\left(\omega_1\frac{T}{2}+\Phi_1\right)=\sqrt{A_1^2-X_2^2} \quad (27)$$

Therefore, substituting the expression defined in Equations 26 and 27 in Equations 21 and 23 there is obtained the following expressions which define the digital filter memory contents after the transition $$Y_1=X_1\cos\Delta\omega\frac{T}{2}+\sqrt{A_1^2-X_1^2}\cdot\sin\Delta\omega\frac{T}{2} \quad (28)$$

$$Y_2=X_2\cos\Delta\omega\frac{T}{2}-\sqrt{A_1^2-X_2^2}\cdot\sin\Delta\omega\frac{T}{2} \quad (29)$$

In view of Equation 28 it is seen that the memory correction consists of multiplying the contents of shift register 119 by cos $\Delta\omega T/2$ and then adding to this result $\sqrt{A_1^2 - X_1^2}$ . sin $\Delta\omega T/2$. With respect to shift register 120, the contents thereof are multiplied by cos $\Delta\omega T/2$ and the quantity $\sqrt{A_1^2 - X_2^2}$ . sin $\Delta\omega T/2$ is subtracted from this result.

Circuit 139 discloses an implementation of Equations 28 and 29. As pointed out, the contents of shift register 119 are defined by the expression $X_1$ while the contents of shift register 120 are defined by the expression $X_2$. These two quantities are passed from the outputs of shift registers 119 and 120 into circuit 139 which processes the memory contents to provide altered digital contents as defined in Equations 28 and 29. These altered contents are then fed to gates 133 and 135 and, when the gates are enabled, the contents are passed through to shift register 120 and to subtractor 118, respectively.

As disclosed heretofore, the contents of the memory are altered upon each transition. The transition is determined by shift register 137 and exclusive-OR gate 136. The output obtained from scanner 102 is passed to both register 137 and exclusive-OR gate 136. The other input of exclusive-OR gate 136 is derived from the output of shift register 137.

Shift register 137 is advantageously a multistage register having *n* stages or equal in number to the number of data sources. Shift pulses for the register are derived from lead B0 of bit-count leads 305. Upon each data source being scanned, the resultant "1" bit (mark) or "0" bit (space) is applied to exclusive-OR gate 136 and concurrently inserted into shift register 137. The bit then re-appears at the output of the shift register during the time slot allocated to the same data source but during the next successive scan cycle. If both bits applied to exclusive-OR gate 136 correspond (i.e., both are "1" bits or "0" bits), it is apparent that a data signal transition has not occurred. With the bits corresponding, exclusive-OR gate 136 provides a low output and this output disables AND gates 133 and 135. At the same time the low output is inverted by inverters 132 and 134 to enable AND gates 130 and 131. Accordingly, the contents of shift registers 119 and 120 are passed through AND gates 130 and 131 in the normal manner when no transition occurs.

Assume now that a transition occurs during a cycle. The bit at the output of shift register 137 now differs from the bit being applied to the input of shift register 137. The discrepancy in the bits applied to exclusive-OR gate 136 develops a high signal at the output thereof. This enables AND gates 133 and 135 and at the same time disables AND gates 130 and 131. The above described normal passage of the contents of the shift register memories is therefore precluded. With AND gates 133 and 135 enabled, however, the contents as altered by circuit 139 are now passed therethrough.

Circuit 139 generally includes multipliers, adders, subtractors and in addition a word generator circuit, a pair of squaring circuits, and a pair of square-rooting circuits. It is to be understood that these digital circuits, in general, are maintained in synchronization by clock counter 301 and, more specifically, these digital circuits are operated under the control of bit-count leads 305.

The output of shift register 119 is passed to multiplier 140 and to squarer 141. The output of shift register 120 is passed to multiplier 150 and squarer 151. Multipliers 140 and 150 are arranged substantially in the same manner as multipliers 115 and 116, with the exception that the multiplying factor is defined as the constant cos $\Delta\omega T/2$. Squarers 141 and 151 are circuits for squaring digit numbers (i.e., circuits which multiply the digital number applied thereto by itself). Suitable squaring circuits of this nature are disclosed, for example, in "*Digital Computer Design Fundamentals*" *by Yaohan Chu, McGraw Hill, New York*, 1962, on pages 24–35, and 442–447.

The output of multiplier 140 is passed to one input of adder 146 and the output of squarer 141 is applied to subtractor 142. Another input to subtractor 142 is provided by word $A_1^2$ generator 143. It is the function of the generator to repeatedly generate a fixed quantity defined by the term $A_1^2$. This generator, for example, may be of the type similar to the word generator disclosed in the copending application of C. A. Buzzard et al, Ser. No. 884,250, filed on Dec. 11, 1969. Subtractor 142 then subtracts the quantity provided by squares 141 from the quantity generated by generator 143. Accordingly, the output of subtractor 142 defines the quantity $A_1^2 - X_1^2$. This quantity is passed to square rooter 144 which obtains the square root of the expression.

Square rooter 144 is a conventional digital circuit. A suitable example is disclosed in the above-disclosed publication of Chu, pages 43–48, 435–437. The resultant square root output of square rooter 144 is applied to multiplier 145 which multiplies by a constant defined by the expression sin $\Delta\omega T/2$. The resultant output of multiplier 145 is applied to an input of adder 146. Adder 146 thus adds the outputs of multiplier 140 and multiplier 145 and the resultant output of adder 146 then defines the expression disclosed in Equation 28. This comprises the altered memory contents which are then passed through AND gate 133, when it is enabled as described above, to the input of shift register 120.

As noted above, the contents ($X_2$) of shift register 120 are passed to multiplier 150 and squarer 151. The output of multiplier 150 is applied to subtractor circuit 156 and the output of squarer 151 is passed to subtractor 152. The other input to subtractor 152 is provided by word $A_1^2$ generator 143. Accordingly, the output of subtractor 152 defines the expression $A_1^2 - X_2^2$. The square root of this expression is determined by square rooter 154 whose output extends to multiplier 155. Multiplier 155 multiplies the output of square rooter 154 by a constant defined by the expression sin $\Delta\omega T/2$. This result is then passed to subtractor 156. Since the other input to 156 is provided by multiplier 150, the resultant output of subtractor 156 is defined by the expression in Equation 29. This altered memory content is passed through gate 135, when it is enabled, to subtractor 118.

It is noted that the operation of square rooters 144 and 154 and to some extent the operation of squarers 141 and 151 involve some delay. Accordingly, to compensate for this delay, the inputting to circuit 139 (instead of being derived from the outputs of shift registers 119 and 120) may be obtained from an intermediate point within delay units 119 and 120 or from the inputs of the delay memory units. The point at which the inputting is obtained is of course determined by the amount of delay in circuit 139.

The circuits used for multiplying and obtaining square roots are very complex and expensive. In addition, prior knowledge of the amplitude value $A_1$ is required. Accordingly, it is desirable that correction arithmetic be performed using only linear operations and gating with relatively no delay and it is also desirable that the arithmetic be performed without requiring knowledge of the amplitude value. Such a correction can be performed by a circuit of the type shown in FIG. 2 and identified by block 239.

Figure 2:
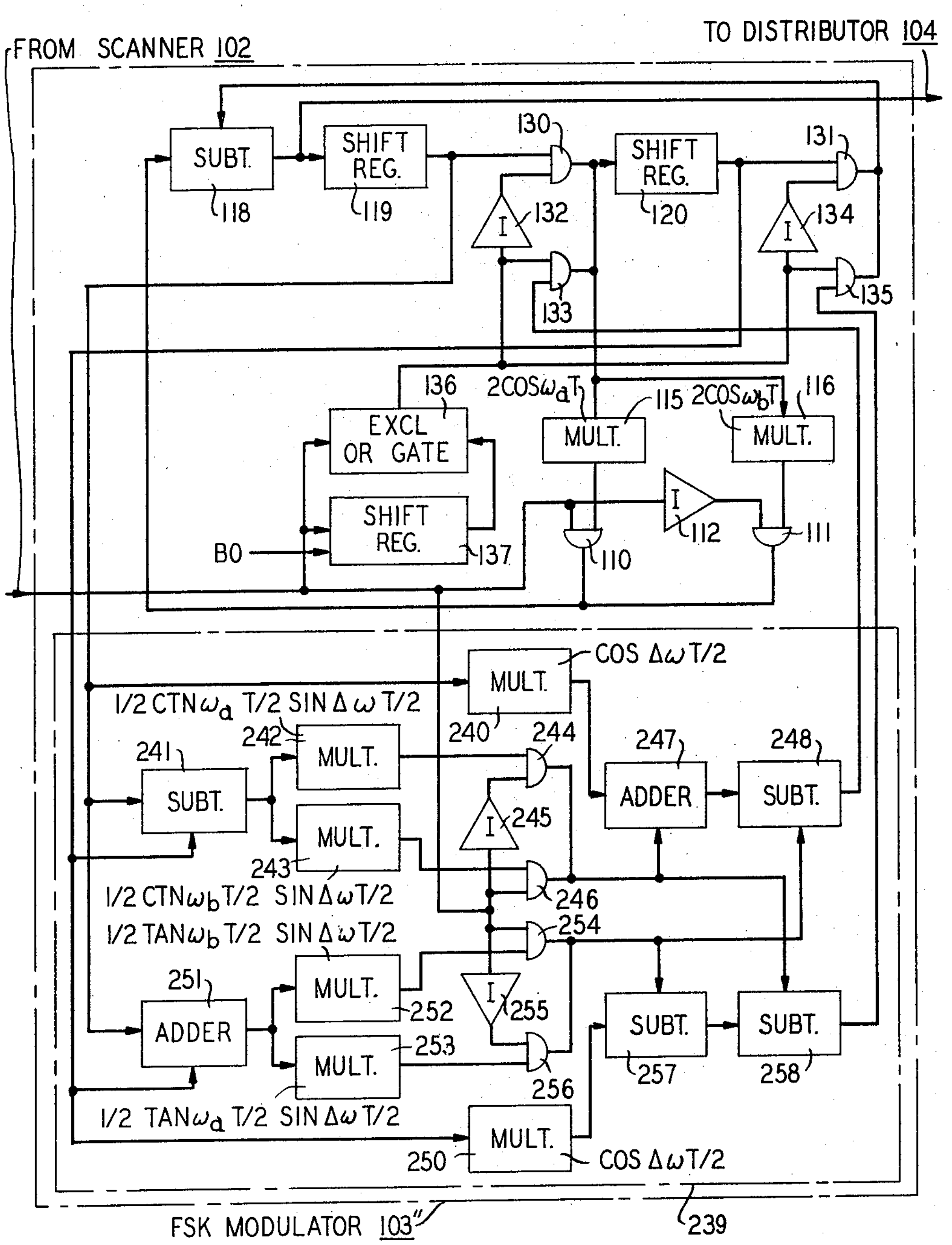
FIG. 2 shows, in schematic form, another arrangement of a frequency-shift modulator in accordance with this invention.

FIG. 2 shows an FSK modulator (modulator 103'') which is similar to FSK modulator 103'. An examination of FSK modulator 103'' in FIG. 2 discloses that the digital filter therein is arranged similar to, and the components (delay units, multipliers, et cetera) are identified by the same designations as, the digital filter disclosed in FIG. 1. In addition, the outputs of delay units 119 and 120 are passed to circuit 239 in FIG. 2 in the same manner as corresponding outputs are passed to circuit 139 in FIG. 1. Circuit 239, however, accepts an additional input as derived from the output of scanner 102. The outputs of circuit 239 are passed back to AND gates 133 and 135 in the same manner as the outputs of circuit 139 are passed to correspondingly identified gates in FSK modulator 103' in FIG. 1.

Considering now the derivation of the linear scheme, it can be seen that Equations 21 and 23 can be expanded to $$Y_1=X_1\cos\frac{\Delta\omega T}{2}+A_1\sin\frac{\Delta\omega T}{2}\sin\Phi_1\cos\frac{\omega_1 T}{2}-A_1\sin\frac{\Delta\omega T}{2}\cos\Phi_1\sin\frac{\omega_1 T}{2}\qquad(30)$$

$$Y_2=X_2\cos\frac{\Delta\omega T}{2}-A_1\sin\frac{\Delta\omega T}{2}\sin\Phi_1\cos\frac{\omega_1 T}{2}-A_1\sin\frac{\Delta\omega T}{2}\cos\Phi_1\sin\frac{\omega_1 T}{2}\qquad(31)$$

From Equations 12 and 13 it is readily seen that $$X_1+X_2=2A_1\cos\Phi_1\cos\frac{\omega_1 T}{2}\qquad(32)$$

$$X_1-X_2=2A_1\sin\Phi_1\sin\frac{\omega_1 T}{2}\qquad(33)$$

Substituting Equations 32 and 33 into Equations 30 and 31, respectively, yields $$Y_1=X_1\cos\frac{\Delta\omega T}{2}+\frac{1}{2}(X_1-X_2)\operatorname{ctn}\frac{\omega_1 T}{2}\sin\frac{\Delta\omega T}{2}-\frac{1}{2}(X_1+X_2)\tan\frac{\omega_1 T}{2}\cdot\sin\frac{\Delta\omega T}{2}\qquad(34)$$

$$Y_2=X_2\cos\frac{\Delta\omega T}{2}-\frac{1}{2}(X_1-X_2)\operatorname{ctn}\frac{\omega_1 T}{2}\sin\frac{\Delta\omega T}{2}-\frac{1}{2}(X_1+X_2)\tan\frac{\omega_1 T}{2}\cdot\sin\frac{\Delta\omega T}{2}\qquad(35)$$

The expressions defined by Equations 34 and 35 are implemented by the circuit generally shown by block 239 in FIG. 2. As seen in the figure, the contents of shift register 119 are applied, in parallel, to multiplier 240, subtractor 241 and adder 251. The contents of shift register 120 are applied in parallel to multiplier 250, subtractor 241, and adder 251.

Multiplier 240 is arranged to provide a multiplier constant which is defined by the expression cos $\Delta\omega T/2$. The output thereof yields the quantity $X_1\cos\Delta\omega T/2$. Multiplier 250 is also arranged to provide the multiplier factor cos $\Delta\omega T/2$ and the output thereof comprises a quantity defined by the quantity $X_2\cos\Delta\omega T/2$. Subtractor 241 functions to subtract the contents of shift register 120 from the contents of shift register 119 to provide a quantity defined by the expression, $X_1-X_2$. Adder 251 adds the contents of shift registers 119 and 120 to provide at the output the quantity $X_1+X_2$.

The output of subtractor 241 is applied, in parallel, to multiplier 242 and multiplier 243. Multiplier 242 is arranged to multiply the quantity applied to the input by a factor defined by the expression $\frac{1}{2}\operatorname{ctn}\omega_a T/2\sin\Delta\omega T/2$. The output of multiplier 242 is therefore the quantity $$\tfrac{1}{2}(X_1-X_2)\operatorname{ctn}\omega_a T/2\sin\Delta\omega T/2\,.$$

Multiplier 243 is arranged to multiply the quantity applied to its input by the constant $\frac{1}{2}\operatorname{ctn}\omega_b T/2\sin\Delta\omega T/2$ thereby providing at its output a quantity defined by the expression $$\tfrac{1}{2}(X_1-X_2)\operatorname{ctn}\omega_b T/2\sin\Delta\omega T/2\,.$$

The output of adder 251 is applied in parallel to multiplier 252 and multiplier 253. Multiplier 252 multiplies the quantity applied to its input by a constant factor defined by the equation $$\tfrac{1}{2}\tan\omega_b T/2\sin\Delta\omega T/2.$$

Multiplier 253 multiplies the quantity applied to its input by the factor $$\tfrac{1}{2}\tan\omega_a T/2\sin\Delta\omega T/2.$$

The outputs of multipliers 242 and 243 are passed to gates 244 and 246, respectively. As described hereinafter, gates 244 and 246 are enabled alternatively whereby one or the other passes the output of multipliers 242 or 243 to adder 247 and subtractor 258.

The outputs of multipliers 252 and 253 are passed to gates 254 and 256. These latter gates are also enabled alternatively whereby one or the other passes the output of multipliers 252 or 253 to subtractor 257 and subtractor 248.

The output of multiplier 240 is applied to the input of adder 247. Adder 247 therefore sums the output quantity provided by multiplier 240 with the output quantity provided by either multipliers 242 or 243. Subtractor 248 then subtracts from this result the output quantity provided by multipliers 252 or 253. The resultant output of subtractor 248 is then passed to gate 133 and, when this gate is enabled, the quantity is passed therethrough to the input of shift register 120. This quantity comprises the altered contents of the memory as defined in Equation 34.

The output of multiplier 250 is passed to subtractor 257. Subtractor 257 subtracts from this quantity the output derived from multiplier 252 or multiplier 253. The result is then passed to subtractor 258 which further subtracts the quantity derived from multipliers 242 or 243. The resultant output of subtractor 148 is then passed to AND gate 135 and, when it is enabled, into the digital filter. This alters the contents of the digital filter memory in accordance with Equation 35.

Assume first that a data source is sending a spacing signal and that a transition to a marking signal occurs. After the transition, a marking "1" bit is applied to the inputs of exclusive OR gate 136 and shift register 137. The output of shift register 137 at this time comprises a spacing "0" bit corresponding to the signal during the previous scan cycle. Exclusive OR gate 136 thereupon enables AND gates 133 and 135 permitting the insertion into the filter of the data being processed by circuit 239.

It is recalled that a marking "1" bit is being applied to exclusive OR gate 136 and shift register 137. This "1" bit is also passed to the input of AND gates 246 and 254. At the same time the bit is inverted by inverters 245 and 255 and the inversion thereof disables AND gates 244 and 256. Accordingly, upon the transition of the signal from spacing to marking, AND gates 246 and 254 are enabled and gates 244 and 256 are disabled.

With gate 246 enabled, the output of multiplier 243 is passed therethrough. As previously described, this output defines the expression $$\tfrac{1}{2}(X_1 - X_2) \operatorname{ctn} \omega_b T/2 \sin \Delta\omega T/2.$$

It is noted that in this case, the spacing frequency $\omega_b$ comprises the angular frequency $\omega_1$ prior to the transition. Similarly, AND gate 254 passes the output of multiplier 252, which output defines the expression $$\tfrac{1}{2}(X_1 + X_2) \tan \omega_b T/2 \sin \Delta\omega T/2$$

where the spacing frequency $\omega_b$ defines the angular frequency $\omega_1$ of the wave prior to the transition. Therefore, the quantity provided at the output of subtractor 248 corresponds to the expression defined by Equation 34 with the angular frequency $\omega_1$ prior to the transition being the spacing frequency $\omega_b$.

If the data signal goes from the marking signal to the spacing signal, then after the transition a spacing "0" bit is applied to the inputs of exclusive OR gate 136 and shift register 137 concurrently with a marking "1" bit appearing at the output of shift register 137. AND gates 133 and 135 are again enabled but, at this time, a "0" bit is passed to AND gates 246 and 254 to disable these gates. Inverters 245 and 255 invert the "0" bit, however, and thereby enable AND gates 244 and 256.

With AND gate 244 enabled, the output of multiplier 242 is passed therethrough. At the same time AND gate 256 passes the output of multiplier 253 therethrough. Subtractor 248 therefore provides at its output an expression corresponding to Equation 34 and subtractor 258 provides at its output an expression corresponding to Equation 35 where the angular frequency $\omega_1$ of the wave prior to the transition of the data signal is defined by the marking frequency $\omega_a$.

Although specific embodiments of this invention have been shown and described, it will be understood that various modifications may be made without departing from the spirit of this invention.

What is claimed is:

1. A frequency-shift modulator comprising a digital filter for processing multibit numbers, the digital filter including means for storing the multibit numbers, means for placing the digital filter on the borderline of stability to produce oscillations, and means for changing the filter central coefficient in response to an applied data signal to thereby produce numbers representing the amplitude and phase of points on a frequency shift signal wave, Characterized in that means maintain the phase of the signal wave after each frequency shift continuous with the phase of the wave before the frequency shift, comprising means effective during limited intervals defined by the transitions of the data signal for changing the stored multibit numbers to numbers representing points having the same phase but on a wave different in frequency.

2. A frequency-shift modulator in accordance with claim 1 wherein the means for changing the stored multibit numbers obtain new numbers representing points having the same amplitude.

3. A frequency-shift modulator in accordance with claim 2 wherein the means for changing the stored multibit numbers obtain new numbers defined by the expression:

$X \cos \Delta\omega T + \sqrt{A^2 - X^2} \sin \Delta\omega T$ where $X$ represents the stored number, $\Delta\omega$ is the difference between the radian frequencies of the signal waves, $A$ is the amplitude of the signal wave and $T$ is the time interval between successive ones of the points on the wave.

4. A frequency-shift modulator in accordance with claim 2 wherein the means for changing the stored multibit numbers obtain new numbers defined by the expression:

$$X \cos \Delta\omega T - \sqrt{A^2 - X^2} \sin \Delta\omega T$$

where $X$ represents the stored number, $\Delta\omega$ is the difference between the radian frequencies of the signal waves, $A$ is the amplitude of the signal wave and T is the time interval between successive ones of the points on the wave.

5. A digital filter frequency-shift modulator for storing and processing multibit numbers including means for changing the filter central coefficient in response to samples of an applied data signal to produce numbers defining the amplitude and phase of successive points on a frequency-shift signal wave and at least two storing means for storing numbers representing two successive points on the wave, Characterized in that, means responsive to a transition of the sampled data signal extract the numbers representing two successive points on the signal wave produced in accordance with the data signal, means process the two extracted numbers to develop a new number defining a point having the same amplitude and phase as the point defined by one of the extracted numbers but on a signal wave different in frequency, and means insert the new number into one of the storing means.

6. A digital filter frequency-shift modulator in accordance with claim 5 wherein the process means is further responsive to samples of the applied data signal to develop the new number.

7. A digital filter frequency-shift modulator in accordance with claim 5 wherein the process means is arranged to develop the new number as defined by the expression:

$$X_1 \cos \frac{\Delta\omega T}{2} + \frac{1}{2}(X_1 - X_2)\, ctn \frac{\omega_1 T}{2} \sin \frac{\Delta\omega T}{2} - \frac{1}{2}(X_1 + X_2) \tan \frac{\omega_1 T}{2} \sin \frac{\Delta\omega T}{2}$$

where $X_1$ and $X_2$ represent the two extracted numbers, $\Delta\omega$ is the difference in the radian frequencies of the two signal waves, $\omega_1$ is the frequency of the wave defined by the extracted numbers and $T$ is the time interval between the successive points on the wave and wherein the new number is inserted into the storing means from whence the number $X_1$ is extracted.

8. A digital filter frequency-shift modulator in accordance with claim 5 wherein the process means is arranged to develop the new number as defined by the expression:

$$X_1 \cos \frac{\Delta\omega T}{2} + \frac{1}{2}(X_1 - X_2)\, ctn \frac{\omega_1 T}{2} \sin \frac{\Delta\omega T}{2} - \frac{1}{2}(X_1 + X_2) \tan \frac{\omega_1 T}{2} \sin \frac{\Delta\omega T}{2}$$

where $X_1$ and $X_2$ represent the two extracted numbers, $\Delta\omega$ is the difference in the radian frequencies of the two signal waves, $\omega_1$ is the frequency of the wave defined by the extracted numbers and T is the time interval between the successive points on the wave and wherein the new number is inserted into the storing means from which the number $X_2$ is extracted.

9. The method of eliminating phase discontinuities in a digital filter frequency-shift modulator which, in response to a binary data signal, stores and processes multibit numbers defining the amplitude and phase of various points on one or the other of two signal waves of different frequencies comprising the steps of;

extracting a number stored in the digital filter each time a transition of the binary data signal occurs, generating a new number defining a point having the same phase as the point defined by the extracted number but being on the signal wave different in frequency, and inserting the new number into the digital filter.

10. The method of eliminating phase discontinuities in a digital filter frequency-shift modulator in accordance with claim 9 wherein the point defined by the new generated number has the same amplitude as the point defined by the extracted number.

11. The method of eliminating discontinuities in a digital filter frequency-shift modulator which, in response to a binary data signal, stores and processes multibit numbers defining the amplitude and phase of various points on one or the other of two signal waves of different frequencies comprising the steps of;

extracting a number stored in the digital filter each time a transition of the binary data signal occurs, generating a new number defining a point having the same amplitude as the point defined by the extracted number but being on the signal wave different in frequency, and inserting the new number into the digital filter.

* * * * *